Sept. 12, 1967 V. L. WILLIAMSON 3,340,859
ENGINE EXHAUST GAS TREATMENT SYSTEM
Filed June 2, 1965
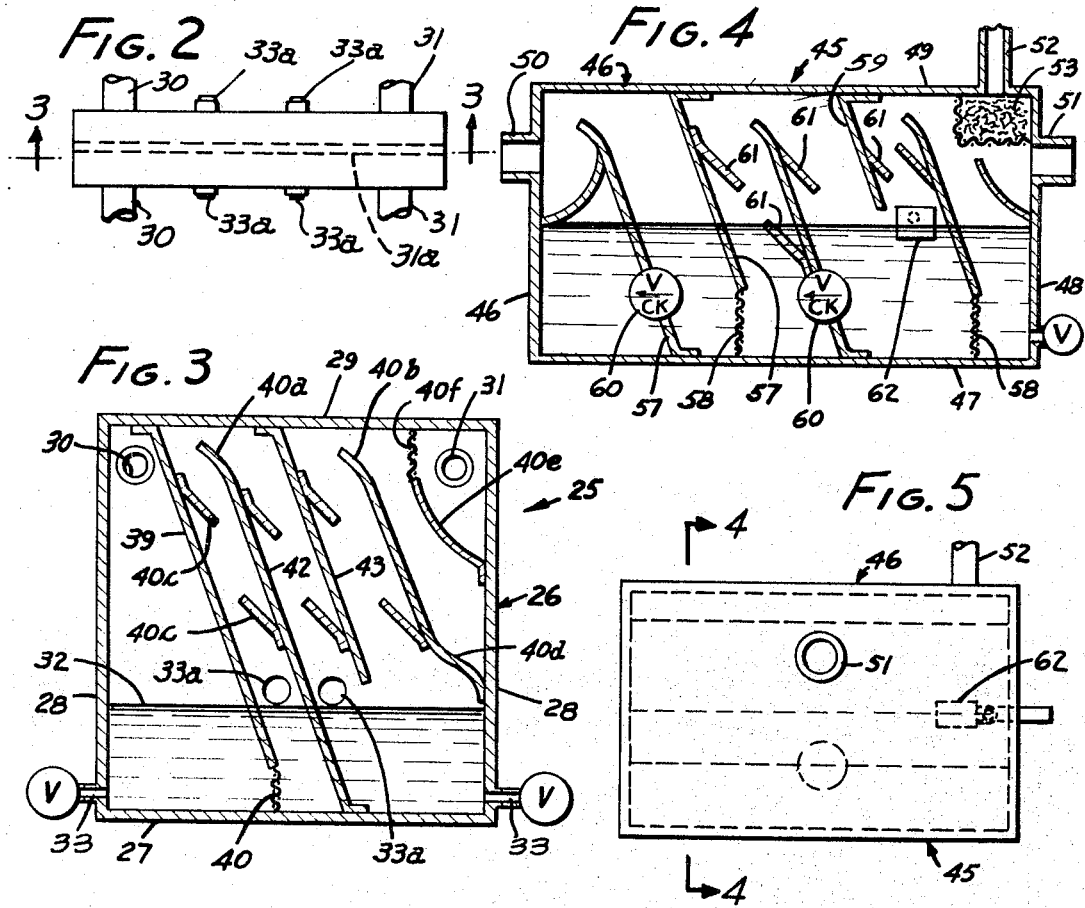
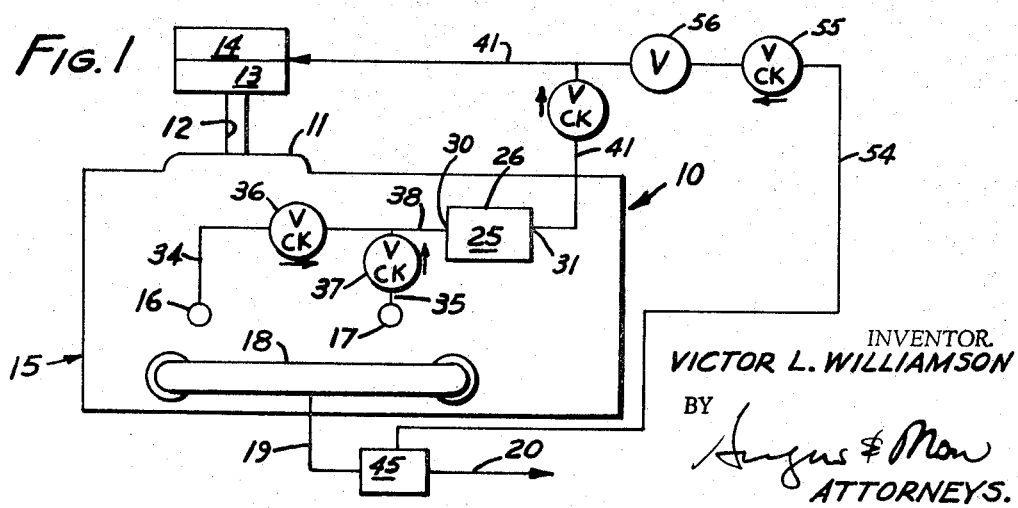
INVENTOR.
VICTOR L. WILLIAMSON
BY
ATTORNEYS.

United States Patent Office 3,340,859
Patented Sept. 12, 1967

3,340,859
ENGINE EXHAUST GAS TREATMENT SYSTEM
Victor L. Williamson, 4834 S. Oak St.,
Pico Rivera, Calif. 90660
Filed June 2, 1965, Ser. No. 460,637
6 Claims. (Cl. 123—119)

ABSTRACT OF THE DISCLOSURE

This invention relates to the treatment of effluent gases from internal combustion engines and comprises baffled scrubbing devices adapted to contain liquid to remove impurities from the gases. In one embodiment of the invention the gases from crankcase breather vents are scrubbed and returned to the intake manifold, and in another embodiment of the invention, exhaust gases are scrubbed and returned to the intake manifold.

---

This invention relates to the treatment of effluent gases from internal combustion engines.

With the increasing use of internal combustion engines, control of effluent gases has become an increasingly urgent necessity. There are two principal sources of effluent gases, one being the crankcase breather, and the other being the exhaust pipe. Complete control of impurities from these two sources has so far not been attained, and it is an object of this invention to provide a control over them which is more effective than any known at the present time.

With respect to the gases derived from the crankcase breather, it is known to return them directly to the intake manifold, generally injecting them adjacent to the carburetor. This has a potential disadvantage in that the passages tend to be plugged, and unless the valves are well maintained, serious damage to the internal parts of the engine can result. It is an object of this invention to remove the impurities from these gases so that the recirculation can occur without incurring the common risk of engine damage derived from failure to maintain the device.

With respect to exhaust gases, it is known that the incomplete combustion of the fuels results in the production of many undesirable by-products, and also leaves unconsumed certain fractions which could be used as fuels. It is an object of this invention to provide treatment means for the exhaust gases which preferably will enable at least a portion of the useful gases to be recirculated and used as fuel, and to remove many of the undesirable impurities from those gases which are exhausted to atmosphere.

This invention is carried out in combination with an internal combustion engine of the class having an intake manifold and an exhaust manifold which, of course, are on opposite sides of the internal combustion machinery which customarily includes piston-cylinder combinations and means for ignition of the fuel charge. This engine also includes a crankcase which has a breather vent.

This invention comprises means for treatment of the exhaust gases and of the gases effluent from the breather vents. With respect to the exhaust gases, means is provided for scrubbing the same, which means includes a tank having a bottom, sides and top, together with an inlet and an outlet. The exhaust gas scrubber tank inlet is connected to the engine exhaust manifold and preferably, but not necessarily, includes a bypass outlet adapted to be connected to the intake manifold, and also includes an exhaust outlet which discharges gases to the atmosphere. Within the tank and extending across the same from side to side and to the top, but clearing the bottom, is at least one baffle which reduces the surge of liquid contained therein. The tank is adapted to contain liquid to a level above that of the bottom of the baffle. The inlet is on the opposite side of one of the baffles from the outlet.

Preferably, but not necessarily, a plurality of such baffles are formed and unidirectional flow means is provided across at least one of them to permit equalization of the fluid of the liquid level across the baffles in the tank.

Treatment of the gases effluent from the breather vent comprises a tank having a bottom, sides and top, together with an inlet and an outlet which are disposed on opposite sides of a baffle which extends from side to side and to the top thereof, but is spaced from the bottom. This breather vent scrubber tank is adapted to contain liquid to a level above the bottom of the baffle.

According to a preferred but optional feature of the invention, the exhaust gas scrubber tank is provided with a permeable medium adjacent to the bypass outlet which slows the gas velocities at this region and permits lighter fractions of the gases to escape from the exhaust gas scrubber tank through the bypass outlet.

The above and other features of this invention will be fully understood from the following detailed description and the accompanying drawings in which:

FIG. 1 is a side elevation of an automobile engine incorporating the presently preferred embodiment of the invention;

FIG. 2 is a top view of a portion of the invention;

FIG. 3 is a cross-section take nat line 3—3 of FIG. 2;

FIG. 4 is a cross-section taken at line 4—4 of FIG. 5; and

FIG. 5 is a right-hand end view of FIG. 4.

FIG. 1 shows an automobile engine 10 which is schematically illustrated as having an intake manifold 11 with an intake inlet 12. In conventional practice, a carburetor 13 and an air filter 14 form a portion of the intake inlet. Crankcase 15 of the engine includes a pair of breather vents 16, 17, and an exhaust manifold 18 includes an exhaust pipe 19 and a tailpipe 20.

Means 25 is provided for scrubbing gases from the breather vents and returning them to the intake manifold. This means comprises a crankcase gas scrubber tank 26 (see FIG. 3) which includes a bottom 27, sides 28, and top 29. There are two inlets 30 and two outlets 31. A wall 31a divides the tank into two regions, so that the flow is divided between them. Tank 26 is adapted to contain a fluid 32 absorbtive of materials intended to be retained, water being a convenient example. There are drain openings 33 in the bottom which are controlled by plugs or valves, and side ports 33a into each region just above the water level which are similarly controlled, and through which floating material can be withdrawn by adding extra water.

Conduits 34, 35 are respectively connected to breather vents 16 and 17, and incorporate check valves 36, 37, which discharge unidirectionally into conduit 38, to inlet 30 of tank 26. Tank 26 further includes a baffle 39 which extends from side to side of the tank and makes a fluid seal with the top. However, it clears the bottom of the tank so that a water level can rise on each side thereof. If desired, a screen 40 can be provided at the bottom of the baffle. It will thereby be seen that effluent gases which enter inlet 30 can flow through the water to make a "wet pass." Baffles 40a and 40b extend the flow path in a "dry pass," and secondary baffles 40c further lengthen the path. Baffle 40d directs the flow from the dry pass toward the outlet, and shelf 40e provides a means for holding a packing (not shown) near the outlet, if desired. A screen 40f is provided to aid in holding the packing. These baffles are provided on both sides of wall 31a. Suitable access means to the inside of the tank will be provided, but are not shown in detail. Gases proceed through outlet 31, and through conduit 41 to the intake manifold, particularly to a region of low pressure such as that immediately adjacent to the carburetor. It will thereby be seen that fluid flow is from the breather vents through the liquid in the tank 26 through conduit 41 to the intake manifold.

To aid in maintaining a suitable water level, maximum flow path, and to break up the gas flow, additional baffles 42, 43, which may, if desired, be perforated, can be provided.

Means 45 is provided for treating the exhaust gases, and this includes an exhaust gas scrubber tank 46 which is generally similar to tank 26, except that because of the greater volume of gases to be handled, there is a need for a larger size, and for more frequent replenishment of the liquid. Tank 46 includes a bottom 47, sides 48, top 49, an inlet 50, outlet 51 and bypass outlet 52. Inside the tank and immediately adjacent to the bypass outlet, there is a permeable member 53 such as stainless steel wool, which has as its objective to slow down the flow of gases in this region thereby to permit lighter fractions of the gases to pass through the bypass outlet, and conduit 54 through check valve 55 to conduit 41 and thence into the intake manifold. The presence of a shutoff valve 56 indicates that this return of exhaust gas fractions to the intake manifold is a preferred but optional feature, and is not necessary to the invention.

Within the tank 46 there is provided a plurality of baffles 57, all of which extend from side to side, and some make a fluid seal with the top and some with the bottom. Some of those baffles which clear the bottom may include screens 58 which tend to retain any solids which may have become entrained with the gases. The left-hand three baffles causes a "wet pass" through the water, and there may be more than one set of these. The right-hand set of baffles includes one, 59, which clears the water level, and causes a "dry pass." There may be more than one of these sets, too. Check valves 60, which may be simple flapper valves, may be placed in certain of the baffles, if desired, to keep the liquid level constant. Perforated grates 61 may be placed in the flow path to break up the flow, to render it more turbulent, and lengthen the flow path.

It is to be understood that the device shown constitutes a complete control for all effluent gases, both those from the crankcase and from the exhaust, and also provides a means for economizing on fuel by returning lighter fractions from the exhaust gases to the intake manifold for repassage through the engine. However, it is possible to operate without the recirculation of gases to the intake manifold from the exhaust gas scrubber tank, or also to operate means 25 and 45 singly.

Means 45 may conveniently have a float 62 of the ballcock type together with a reservoir (not shown) for the purpose of maintaining a sensibly constant liquid level therein. Such systems are well known and need to be shown in no detail here.

While water has been shown as the principal material to be used, it will be recognized that it is suggested because of its universal availability and because it is inexpensive. However, it is to be understood that other more selectively absorbtive liquids may be provided instead, if desired.

To keep the liquid from being blown out of either tank, the major baffles preferably stand at about 70° to the horizontal, and the minor baffles stand at 45° to the horizontal. The purpose is to keep the liquid moving toward the inlet, and to provide enough path length to cause the liquid to be left behind.

This invention provides an inexpensive device which may be made of metal or even cast out of plastic, if desired, which can readily control the effluents of an engine to good advantage.

This invention is not to be limited by the embodiments shown in the drawings and described in the description which are given by way of example and not of limitation, but only in accordance with the scope of the appended claims.

I claim:

1. A combination with an internal combustion engine having an intake manifold with a manifold inlet, and an exhaust manifold, means for scrubbing gases from the exhaust manifold and returning the scrubbed gases at least in part to the intake manifold, comprising: an exhaust gas scrubber tank having a tank inlet connected to the exhaust manifold, a tank outlet discharging to atmosphere, and a bypass outlet connected to the manifold inlet, said exhaust gas scrubber tank comprising a bottom, sides and top which form a fluid tight enclosure, a plurality of baffles extending across the inside of the exhaust gas scrubber tank connecting opposite sides of the wall but spaced from the bottom to form a surge baffle, the tank inlet being on one side of the baffle, and the two outlets being on the other side thereof, the exhaust gas scrubber tank being adapted to contain liquid to a level above the bottom of the baffle, at least one of said baffles including a check valve across it which will permit liquid to flow past the baffle toward the tank inlet.

2. In combination with an internal combustion engine having a crackcase with a breather vent and an intake manifold with a manifold inlet, and an exhaust manifold, and means for scrubbing gases from the breather vent to remove impurities therefrom and to return the scrubbed gases to the manifold inlet comprising a crankcase gas scrubber tank having a tank inlet connected to the breather vent and a tank outlet connected to the manifold inlet, the crankcase gas scrubber tank comprising a fluid-tight container including filler means, a bottom, peripheral sides, and a top, and at least one baffle extending across the inside of the crankcase gas scrubber tank connecting opposite sides of the wall but spaced from the bottom to form a surge baffle, the tank inlet and tank outlet being on opposite sides of the baffle, the crankcase gas scrubber tank being adapted to contain liquid to a level above the bottom of the baffle, and means for scrubbing gases from the exhaust manifold and returning the scrubbed gases at least in part to the intake manifold, comprising an exhaust gas scrubber tank having a tank inlet connected to the exhaust manifold, a tank outlet discharging to atmosphere, and a bypass outlet connected to the manifold inlet, said exhaust gas scrubber tank comprising a bottom, sides and top which form a fluid-tight enclosure, as least one baffle extending across the inside of the exhaust gas scrubber tank connecting opposite sides of the wall but spaced from the bottom to form a surfge baffle, the tank inlet being on one side of the baffle, and the two outlets being on the other side thereof, the exhaust gas scrubber tank being adapted to contain liquid to a level above the bottom of the baffle.

3. In combination with an internal combustion engine having a crankcase with a breather vent and an intake manifold with a manifold inlet, and an exhaust manifold, and means for scrubbing gases from the breather vent to remove impurities therefrom and to return the scrubbed gases to the manifold inlet comprising a crankcase gas scrubber tank having a tank inlet connected to the breather vent and a tank outlet connected to the manifold inlet, the crankcase gas scrubber tank comprising a fluid-tight container including filler means, a bottom, peripheral sides, and a top, the crankcase gas scrubber tank being adapted to contain liquid through which the gas is caused to flow, and means for scrubbing gases from the exhaust manifold and returning the scrubbed gases at least in part to the intake manifold, comprising an exhaust gas scrubber tank having a tank inlet connected to the exhaust manifold and, a tank outlet discharging to atmosphere, said exhaust gas scrubber tank comprising a bottom, sides and top which form a fluid-tight enclosure, the exhaust gas scrubber tank being adapted to contain liquid to a level above the bottom of the baffle through which the gas is caused to flow.

4. A combination according to claim 3 in which the exhaust gas scrubber tank includes a bypass outlet connected to the manifold inlet.

5. A combination according to claim 4 in which a permeable member is placed in the exhaust gas scrubber tank immediately adjacent to the bypass outlet to slow fluid speed in that region.

6. A combination according to claim 2 in which additional baffles are provided in each tank which extend from the top to an elevation above the anticipated liquid level in the tank, whereby when gases pass under a baffle terminating beneath the water, a "wet pass" is made by the gases, and when it passes under the additional baffles, a "dry pass" is made without passage through the water.

References Cited

UNITED STATES PATENTS

| | | | |
|---|---|---|---|
| 2,731,958 | 1/1956 | Robley | 123—119 |
| 2,737,936 | 3/1956 | Clarke | 123—119 |
| 2,956,559 | 10/1960 | Johnson | 123—119 |
| 3,013,546 | 12/1961 | Bonifield | 123—119 |

CARLTON R. CROYLE, *Primary Examiner.*

RALPH D. BLAKESLEE, *Examiner.*